Patented Aug. 29, 1933

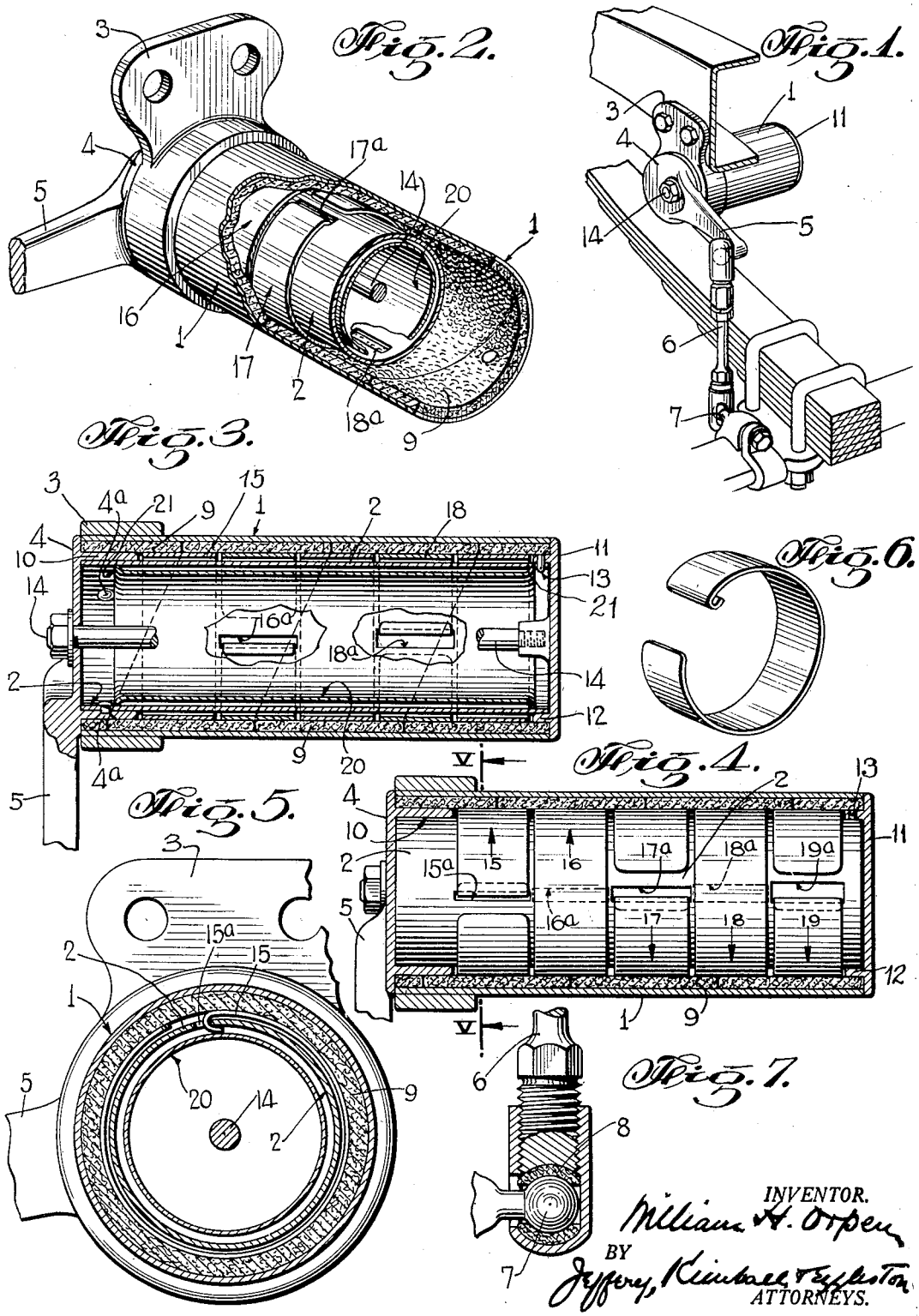

1,924,802

UNITED STATES PATENT OFFICE 1,924,802

SHOCK ABSORBER

William H. Orpen, Brooklyn, N. Y.

Application August 1, 1929. Serial No. 382,661

40 Claims. (Cl. 188—130)

The invention is an improved friction-type shock absorber or snubber suited for use on automobiles as well as in other relations and relates to the general organization and structure of the several parts whereby such a device is suited for economic manufacture and can be easily accommodated in design to accomplish different results and with a permanent and high degree of efficiency, and whereby other advantages may be obtained, all as will be clear to those skilled in this art from the following disclosure.

Its form at present preferred is illustrated in the drawing hereof, by way of exemplification of the principles involved.

Fig. 1 is a perspective of such form as it may be applied to an automobile,

Fig. 2, a broken out perspective illustrating the friction lining,

Fig. 3, an axial section,

Fig. 4, a similar section but with the shoe carrier and shoes in elevation,

Fig. 5, a section on V—V of Fig. 4,

Fig. 6, the friction shoe of this form, and

Fig. 7, a detail of the ball and socket link joint.

The device shown comprises two concentric members 1 and 2 which are preferably tubular cylinders, and are respectively adapted for connection to the two parts whose relative movement is to be resisted, for instance, to the side girder and axle of an automobile as shown, and in such manner that relative movement of those parts causes relative rotation of one cylinder within the other. The mode of connection may be as desired, for example, as indicated in Fig. 1, in which the exterior cylinder 1 has an attachment flange 3 at one end to be bolted to the vehicle side girder and the other cylinder has a head 4 at the adjacent end provided with a radial crank arm 5, to be connected to the vehicle axle through a link 6 ball-jointed at its ends to the crank arm and the axle respectively. The detail of these joints is shown in Fig. 7, wherein it will be observed that the ball member 7 is confined between two pieces 8 of heavy asbestos fabric known as brake lining. This material is well suited for the ball joints of shock absorber connections in that it permits a snug fit between the ball and socket, eliminating any tendency to rattle, especially when worn, besides tending to shut off transmission of sound from one part to the other. The socket, thus lined, is set up tight in the first instance against the ball, by adjustment of the threaded socket shell, as will be understood, and does not thereafter require lubrication.

The resistance to rotation is produced by friction created in the annular space between the two cylinders, and by means of a series of successively adjacent friction elements or shoes which are carried by one member to press against the other, the friction effect being obtained by the interposition of friction-producing fabric or like material. According to this invention, the friction duty of the absorber is carried and shared by several relatively small friction shoes instead of a larger single shoe or pair of shoes, as heretofore, and this division has the advantage that a high degree of efficiency is thereby secured and maintained, since a shoe of small radius and moderate width is easily actuated and controlled so as to cause it to exert a substantially uniform pressure over its whole friction area, whereas it is a matter of some difficulty to make a larger shoe produce such contact under stress of working conditions. But by distributing the duty among several small shoes each of which constantly works at its own maximum efficiency, the device as a whole, becomes correspondingly efficient and without need of any particular care in its fabrication or special adjustment at the time of assembly, and retains its efficiency; the heat dissipation is better, the rate of wear seems to be slower and the device can be made of a shape, novel for friction-type absorbers, which adapts it for use on automobiles in ways not heretofore practical for that type, that is to say, of small external diameter, say not exceeding 3 or 3½ inches, and relatively long in the direction of the rotary axis, the length being always greater than the diameter and being greater or less according to the number of friction shoes employed; increase of friction capacity, according to this invention, is produced by increasing the number of the shoes and the axial length of the device rather than by increasing the size of shoe. I am aware that shock absorbers have heretofore been proposed in which the total friction duty is divided between as many as two friction shoes, but for automobiles such division is not fully satisfactory inasmuch as the movement of the spring of an ordinary automobile, when damped only by the resistance of two shoes, requires each to be quite large—larger than can be made to work continuously with best efficiency. As distinguished from such prior proposals, none of which has appeared on the market so far as I am aware, the present device is characterized by the distribution of the friction duty among more than two friction elements and by their successively adjacent positions and by the elongated shape and narrow diameter of the members between which they are assembled.

Within this principle, the device can be constructed in various ways and so as to afford different resistance effects. Preferably the outer cylinder forms or carries the friction surface or fabric lining and the inner member carries the series of shoes, which therefore operate by expansion outwardly against such surface or lining; that is to say, in the preferred form the friction is produced by shoe expansion rather than contraction, although either is practical. In either case the two cylinders can be economically produced from cut lengths of ordinary cold-rolled or electric-welded steel tubing, since precise accuracy of dimension is not necessary.

The friction-producing lining may consist of heavy asbestos fabric interwoven with metallic wire and commonly known as brake-lining and is applied to the inner face of the outer cylinder by coiling a ribbon or strip 9 of such material inside of that cylinder, trimming off its ends on a bias and flush with the cylinder and as indicated in Fig. 2, thus making a continuous friction surface in the outer cylinder for common engagement by all the shoes. The ends of the ribbon may be fastened to the cylinder by a rivet as indicated, if desired, though ordinarily such fastening is not found necessary when the lining is applied as described to the outer cylinder.

The inner cylinder 2, which is referred to as the shoe-carrier, is concentrically journalled in the outer cylinder, by means of the two heads which close the ends of the device and are non-rotatably secured to that cylinder. The head 4 is formed with a cylindrical boss 10 embracing the end of the inner cylinder and rivetted to it (rivets marked 4ª in Fig. 3) and the opposite cylinder head 11 has a similar boss 12 fitting over the other end of the inner cylinder and keyed to an end notch therein by a stud or lug 13, so that the two heads thus rotate with the carrier. The outer faces of the bosses 10 and 12 fit within the ends of the friction-fabric lining and thus constitute the bearings for one cylinder in the outer. A through bolt 14 unites the two heads, and is the sole fastening means of the device.

As pointed out, there may be any number of friction shoes according to the magnitude of the load to be restrained, and five are found to handle the average load on one automobile spring in a satisfactory manner and this number is shown in the drawing marked 15, 16, 17, 18 and 19 respectively. They are preferably separately made parts, and they may be and preferably are identical in size, shape and material and either of the expanding or contracting type according to the form in which the invention is embodied. One of them is shown by itself in Fig. 6, being simply a band of steel, preferably spring steel, formed of arcuate shape, of less extent than a complete circle, and with a bent-over and hook-shaped head. The normal circular diameter, when free, is slightly greater than the internal diameter of the fabric lining of the outer cylinder so that when assembled within the latter, it exerts a normal expansive pressure against it. The hook-shaped head constitutes a simple and easily produced means of connection with a tubular shoe carrier, such as the cylinder 2. The wall of this cylinder is punched with a corresponding number of slots of appropriate size into which these heads are hooked and by which the shoes are operated. These slots are marked 15a, 16a, 17a, 18a and 19a respectively, corresponding to the similarly marked shoes and they are located alternately on opposite sides or in different angular positions on the cylinder other than all in a line, so that the cylinder is not weakened thereby; slots 16a and 18a there thus shown as opposite to the others.

With a shoe in its assembled position inside the outer cylinder and with its hooked head engaged with a shoe slot in the inner member, rotation of the latter in the direction which pulls on the head contracts the shoe, relieving its normal friction against the lining 9 and therefore moving it thereover with little or no resistance, but rotation in the opposite direction, in which he edge of the slot pushes on the head tends to expand the shoe, thereby creating increased friction on the lining and correspondingly resisting movements in that direction. Such expansion could not take place if it were not for the normal outward pressure which the shoe exerts on the lining. The friction produced thereby serves as an abutment, so to speak, against which the slot edge works to increase the expansion and thereby increase the friction. Pushing on the head end of a spring shoe already tending to expand increases the expansion, whereas if there were no normal expansive tendency and no starting friction, as it may be called, the rotation would produce no friction. The inherent resilience of the shoes themselves produces their own starting friction, according to this invention, and no spring pressing against the tail end of the shoe such as commonly resorted to for starting the friction is necessary in this device. The use of the spring shoe of itself avoids this complication and its tail end is free of any such connection. This type of shoe, arcuate in shape and made of flat steel ribbon to rub on a fabric surface by virtue of its own elasticity and thereby produce its own starting friction, constitutes a part of this invention which is capable of use independently of the other features herein disclosed, and therefore is not to be assumed as limited thereto except as noted by the claims. Such type of shoe is preferred in the combination under description, but it will be apparent that still other types could be made to produce some of the novel effect of that combination, though it is believed without the same economy of construction and durability.

In order to avoid the possibility that the head of the shoe might push through its slot in the shoe carrier and thus fail to produce expansion, a third cylinder 20 is slipped into the inner cylinder 2 so as to overlie and cover the inner ends of the shoe hooks and serve as guard against such malfunctioning. This guard cylinder is centralized in the cylinder 2 by means of its end flanges 21. The same result could obviously be secured otherwise, but the use of the guard cylinder suffices very well for the purpose and is inexpensively produced and assembled. It may be a tube of lighter weight than the other two cylinders and it does not require to be flanged at its ends since it might be held in place solely by engagement with the shoe heads themselves.

According to the preference of the maker, or the requirements of the job on which the device is to be used, the whole frictional resistance may oppose the relative rotation of the two cylinders in either direction, or it may be divided and a part may oppose each direction, according as the friction shoes are hooked on to one edge or the other of their respective shoe slots. If it is desired that the total friction shall be exerted against the recoil of vehicle springs, all of the friction shoes would be so hooked to the carrier as to be expanded by the direction of cylinder rotation which corresponds to recoil. If it is preferred to divide the resistance the device is then assembled with one or more of its shoes hooked to the carrier in the reverse sense to the others so that some work on recoil and some on the compression movement. In the case shown two shoe elements, marked 15 and 16, are applied to the carrier so as to be expanded by compression movement and the three others 17, 18 and 19, are so applied as to be expanded and produce friction on recoil but any other apportionment of the friction is possible and, as already stated, as much friction as desired for both directions can be had by simply adding shoes and extending the length of the cylinders accordingly and still without tendency to overheating.

The division and distribution of the friction duty among a series of independent shoes affords the further advantage that the resistance movement in either direction can be graded in amount according to the extent of such movement. By providing graded lost motion in the connections of the carrier with its shoes, as for example by making the shoe slots (preferred form of connection) of successively greater circumferential widths, the shoes are picked up and expanded one after the other and thus brought into action progressively. Thus a short stroke of the vehicle springs may be opposed by only one shoe, a medium stroke by perhaps two, and a full stroke by still more or all. Thus shoe slots 17a, 18a and 19a will be seen to be successively wider, so that on the recoil stroke, 17 becomes active almost instantly, 18 a few degrees later and 19 still later. These shoes are simultaneously active, though they begin their action in sequence; all of them are active for the full stroke. Similarly the reversely acting shoes have successively wider slots and progressive pick-up, to give an increasing resistance to the compression stroke. Some lost motion may be desirable for all of the shoes whether or not for giving graded resistance, in order that the shock absorber shall have no damping effect at all on spring vibrations of minor amplitude. In that case the lost motion between the carrier cylinder and shoes 15 and 16 is made to correspond to the conditions in hand and the connections to the other shoes are made the same or progressively looser as preferred.

I claim:

1. A shock absorber comprising two axially extended, concentric and relatively rotary members, each attachable to one of the parts to be controlled, a series of more than two radially-acting friction shoes all arranged side by side between said members, frictionally engaging one of them and having operating connection with the other member whereby they are expanded or contracted by the relative rotation of said members.

2. A shock absorber comprising an elongated tubular member attachable to one of the parts to be controlled, a relatively rotary member therein having a crank arm attachable to the other of said parts and located at one end of said tubular member, a series of simultaneously acting expansible and contractible friction shoes disposed between said members, side by side, and all on one side of said crank arm, each shoe having normal frictional engagement with one of said members and having an operating connection with the other member whereby they are jointly contracted or expanded by the relative rotation of said members.

3. A shock absorber comprising two relatively rotary concentric members, each having means at the same end for attachment to the parts to be controlled, one of said members carrying a series of expansible friction shoes in successively adjacent positions along its axis, all on one side of its said attachment means, and adapted by its rotation to expand said shoes against the other member.

4. A shock absorber comprising two concentric relatively rotary members, a series of more than two flexible friction shoes between said members all arranged side by side in the direction of the rotary axis, each having normal frictional engagement with one of said members by virtue of its normal pressure thereon and each having operating connection with the other member whereby it is expanded and contracted, by the rotation of said member, and at least two of said shoes being active on one direction of rotation.

5. A shock absorber comprising two concentric relatively rotary members, a series of more than two expansible friction shoes between said members arranged successively side by side in the direction of its rotary axis and each having an individual connection with the inner member and adapted to be expanded by the rotative engagement of said member therewith.

6. A shock absorber comprising concentric relatively rotary members, a plurality of radially-acting friction shoes between said members arranged in successively adjacent positions along the rotary axis, said shoes having frictional engagement with one of said members and having successively engaged operating connections with the other member adapted for progressively actuating said shoes on the relative rotation of said members.

7. A shock absorber comprising two relatively rotary concentric tubes, respectively provided with means of attachment to the parts to be controlled, a plurality of radially-acting-shoes arranged side by side in succesively adjacent positions in and along the annular space between said tubes, each of said shoes having frictional engagement with one of said tubes and each having an operating connection with the other tube.

8. A shock absorber comprising two concentric tubes, a series of friction shoes, each shoe composed of a flat, ribbon-like, metal strip of arcuate form, and all being disposed in successively adjacent positions in the annular space between said tubes, and means for connecting each such shoe with the inner tube for expansion or contraction by virtue of the relative rotation of said tube.

9. A shock absorber comprising two concentric and relatively rotary members, a series of more than two radially-acting friction shoes all arranged side by side between said members and frictionally engaging one of said members, the other member having lost motion connection with said shoes adapted to expand and contract them.

10. A shock absorber comprising two concentric, relatively rotary members, a series of more than two radially-acting friction shoes arranged side by side along the rotary axis, frictionally engaging one of said members, the other of said members being provided with means for successively actuating certain of said shoes on one direction of rotation, and for actuating one or more of said shoes in the opposite direction of rotation.

11. A shock absorber comprising two axially extended, concentric and relatively rotary members, each attachable to one of the parts to be controlled, a series of more than two radially-acting friction shoes arranged side by side between said members, frictionally engaging one of them and having operating connection with the other member whereby they are expanded or contracted by the rotation of said member, one or more of said shoes being active in one direction of rotation and one or more in the other direction.

12. A shock absorber comprising two axially extended, concentric and relatively rotary members, each attachable to one of the parts to be controlled, a series of more than two radially-acting, spring-metal shoes all arranged side by side between said members and normally pressing on one of them to create starting friction therewith, one or more of said shoes having operating connection with the other member to be expanded by one direction of relative rotation and one or more having operating connection with said other member to be expanded by the opposite direction of rotation.

13. A shock absorber comprising outer and inner relatively rotary members, the outer member having an internal friction lining, a series of friction shoes carried on the inner member in successive edge to edge positions thereon in the direction of its axis, one or more of said shoes having lost motion connection with said inner member and adapted to be expanded against said lining by the relative rotation of said members.

14. A shock absorber comprising outer and inner relatively rotary and axially extended members each attachable to a part to be controlled, a series of more than two friction shoes carried by one of said members in successive edge to edge positions in the direction of its axis, said shoes having lost motion connections with said last-mentioned member and one or more of said shoes being active in one direction of relative rotation and one or more in the other.

15. A shock absorber comprising an outer cylinder of greater length than diameter, a rotary shoe carrier therein, a series of more than two friction shoes on said carrier arranged in successive edge to edge positions along the axis thereof, and successively brought into action thereby.

16. A shock absorber comprising outer and inner rotary members, a series of more than two friction shoes arranged in successive edge to edge position on one member and reversibly connectible thereto, whereby the frictional resistance in opposite rotary directions may be mutually varied.

17. A shock absorber comprising outer and inner relatively rotary members and a series of friction shoes on one member to engage the other, more of said shoes being active in one direction of relative rotation than in the other and one at least being active in said other direction.

18. A shock absorber comprising outer and inner relatively rotary members of greater length than diameter, a series of friction shoes arranged on one member in successive edge to edge positions along its axis, more of said shoes being active in one direction of rotation than in the other.

19. A shock absorber comprising outer and inner relatively rotary members of greater length than diameter, a series of more than two friction shoes carried by one member in successive edge to edge positions along the length thereof and adapted for frictional engagement with the other member and means for respectively attaching said members to the parts to be controlled.

20. A shock absorber comprising outer and inner relatively rotary members of greater length than diameter, a series of more than two spring shoes carried in successive adjacent positions on one of said members in the direction of its axis for movement thereby relatively to the other member and by their own resilient pressure on the latter producing starting friction for their respective actions.

21. A shock absorber comprising outer and inner relatively rotary members each attachable to one of the parts to be controlled and both of greater length than diameter, one of them progressively actuating a plurality of friction shoes, said shoes being disposed in successive edge to edge positions in the direction of the axis of said member.

22. A shock absorber comprising outer and inner relatively rotary members of greater length than diameter and each attachable to a part to be controlled, a series of more than two friction shoes carried by one of said members in successive edge to edge positions in the direction of its axis, said shoes having lost motion connections with said member.

23. A shock absorber comprising outer and inner relatively rotary cylinders of greater length than diameter, a series of more than two simultaneously acting friction shoes arranged in successive edge to edge positions along the cylindrical axis frictionally engaging one of said cylinders and having individual means of connection with the other.

24. A shock absorber comprising outer and inner relatively rotary cylinders, the outer cylinder having an internal friction lining, a series of friction shoes carried on the inner member in successive edge to edge positions thereon and adapted to be expanded against said lining by the relative rotation of the latter.

25. A shock absorber comprising two relatively rotary, tubular cylinders, respectively provided with means of attachment to the parts to be controlled and a plurality of friction shoes arranged in successively proximate positions in the space between said cylinders, two or more of said shoes being active on one direction of relative motion and at least one of them on the opposite direction.

26. A shock absorber comprising a cylindrical member, a relatively rotary member therein having a crank arm located at the end of said cylinder, and a series of more than two friction shoes arranged between said members, all on one side of said crank arm in successively proximate positions along the cylinder axis, one or more of said shoes being active in the reverse direction to the others.

27. In a shock absorber, two relatively rotary members one of which is a cylinder, and a friction-producing surface for said cylinder formed of a ribbon of brake-lining material helically coiled against the surface thereof.

28. In a shock absorber two relatively rotary members one of which is a cylinder, a ribbon of friction-producing fabric coiled against the surface of said cylinder to form a continuous cylindrical friction lining therefor and a plurality of friction shoes having common engagement with said cylindrical lining.

29. In a shock absorber, two tubular members one within the other, opposite heads fixed to the ends of one member and journalled in the other, a through bolt uniting said heads, a crank arm on one of said heads and a series of successively adjacent friction shoes in the annular space between said members, actuated by their relative rotation.

30. In a shock absorber, a friction shoe formed of a flat ribbon-like spring-metal strip of arcuate form having an end bent over forming a connection head for the shoe.

31. In a shock absorber, a friction surface, a friction shoe expansible against said surface and formed of a flat strip of metal of arcuate form having one end bent over to form a hook, and a shoe carrier having a slot for said hook adapted to push thereon to expand the shoe against said surface.

32. In a shock absorber, two concentric-tubular cylinders, the inner cylinder having a slot and the outer a fabric lining, and a friction shoe having a head in said slot for movement thereby in either direction.

33. A shock absorber comprising an outer cylinder lined with a friction material, an inner member and a series of simultaneously acting spring friction shoes disposed in successively adjacent positions on the latter member in the direction of its axis and exerting normal pressure on said lining sufficient to create the starting friction therefor.

34. A shock absorber comprising a cylinder having a friction-producing lining extending from end to end thereof, a shoe carrier journalled on said lining and a plurality of friction shoes on the carrier frictionally engaging said lining.

35. A shock absorber comprising two relatively rotary, concentric tubes, an attachment flange secured to one of them, heads secured to the other and constituting journals therefor in the other, a crank on one of said heads and a plurality of simultaneously active friction-shoes carried by the inner tube.

36. A shock absorber comprising a shoe carrier consisting of a tubular member, a shoe having a hooked shaped head hooked in a slot in the wall of said member and a guard member covering the end of the hook.

37. A shock absorber comprising an outer cylinder having an interior friction lining, a shoe carrier therein and a series of more than two spring friction shoes arranged in successively adjacent positions along the length of said carrier, each shoe being adapted to produce starting friction by its normal expansive tendency.

38. A shock absorber comprising two relatively rotary cylinders and a plurality of friction shoes fastened in slots in one of the cylinders in successively proximate positions along the same, the slots being angularly spaced apart.

39. A shock absorber comprising an outer cylinder, an inner cylinder, heads having bosses fixed to the ends of the latter cylinder and forming journals for said cylinder on the other cylinder, a bolt connecting the heads, and a series of friction shoes removably hooked to the inner cylinder.

40. A shock absorber comprising two concentric tubes of greater length than diameter, the outer tube having a friction lining and the inner carrying a series of arcuate frictions shoes each normally pressing on said lining, more of said shoes being active in one direction of relative rotation than on the other.

WILLIAM H. ORPEN.